(12) United States Patent
Hanson

(10) Patent No.: US 10,574,067 B1
(45) Date of Patent: Feb. 25, 2020

(54) MULTI-PURPOSE UTILITY BOX

(71) Applicant: James Hanson, Carmichael, CA (US)

(72) Inventor: James Hanson, Carmichael, CA (US)

(*) Notice: Subject to any disclaimer, the term of this patent is extended or adjusted under 35 U.S.C. 154(b) by 0 days.

(21) Appl. No.: 16/038,521

(22) Filed: Jul. 18, 2018

(51) Int. Cl.
*B65D 85/28* (2006.01)
*H02J 7/00* (2006.01)
*H01R 25/00* (2006.01)
*B25H 3/02* (2006.01)

(52) U.S. Cl.
CPC .............. *H02J 7/0042* (2013.01); *B25H 3/02* (2013.01); *H01R 25/003* (2013.01); *H02J 7/0052* (2013.01)

(58) Field of Classification Search
CPC .... H02J 7/0042; H02J 7/0052; H01R 25/003; B25H 3/02; B25H 3/006
USPC .................. 206/349, 372, 373, 234
See application file for complete search history.

(56) References Cited

U.S. PATENT DOCUMENTS

| | | | | |
|---|---|---|---|---|
| 5,533,843 | A * | 7/1996 | Chung | A45C 5/03 206/349 |
| 7,170,035 | B2 * | 1/2007 | Peterson | B25H 3/02 206/373 |
| 7,290,655 | B1 * | 11/2007 | Wood | A45C 13/02 206/349 |
| 8,084,992 | B2 | 12/2011 | Scheffy et al. | |
| 8,522,795 | B2 * | 9/2013 | Bouix | A45D 33/008 132/212 |
| 8,522,969 | B2 * | 9/2013 | Mason | B25H 3/02 206/234 |
| 2005/0000843 | A1 * | 1/2005 | Zheng | A45C 15/00 206/457 |
| 2008/0035507 | A1 * | 2/2008 | Collister | B25H 3/006 206/349 |
| 2011/0005951 | A1 * | 1/2011 | Baumgartner | B25H 3/006 206/349 |
| 2013/0155657 | A1 * | 6/2013 | Werner | B25H 3/023 362/154 |

* cited by examiner

*Primary Examiner* — Luan K Bui
(74) *Attorney, Agent, or Firm* — Sanchelima & Associates, P.A.; Christian Sanchelima; Jesus Sanchelima

(57) ABSTRACT

The present invention is a multi-purpose utility box, comprising: a storage unit for storing one or more tools, a power plug for connecting to electrical power mains to supply electrical power to tools, a power adaptor to convert supply electrical power to various power supply ranges to meet power requirements of each tools and a power outlet unit to connect various tools and to supply various power supply ranges to tools. The box provides convenient access to power outlet unit for easy working of various tools.

6 Claims, 3 Drawing Sheets

MULTI-PURPOSE UTILITY BOX

BACKGROUND OF THE INVENTION

1. Field of the Invention

The present disclosure relates to a multi-purpose utility box. More particularly, the present disclosure relates to a multi-purpose utility box that provides convenient storage space for various tools of various applications, such as construction work, hair-styling work and also provides multiple electrical outlets for powering such tools.

2. Description of the Related Art

Currently there are few devices available for consumers and professionals for example, hair style workers, painters and construction workers, to neatly and compactly organize and store tools prior to commencing their work. Further, they need a power box/junction box to power various tools during their work. Connecting each tools using a separate connection wire to a power box/junction box or power switch boards, will not provide convenient working environment, hence reduce the productivity. Further this provides the hassle of having to bend over all the time to manage power cords.

Applicant believes that a related reference corresponds to International patent application WO 2015200040 A1 filed by WON, Mitchell for Cosmetic box with fan and nail drying apparatus. The Mitchell reference discloses a cosmetic box inspired by the traditional Asian design. The box comes equipped with electrical apparatus for drying and sterilizing make-up. A fan is mounted within the box. When drawers are ajar, the fan blows air toward the user's face and hair. When the drawers are removed, the user may insert their hands into the drawer cavity to dry their nail polish. Ultraviolet light bulbs are also mounted within the box. The bulbs assist in the sterilization of nail polish as well as the contents of the box.

Applicant believes that a related reference corresponds to U.S. Pat. No. 8,084,992 B2 filed by Snap-on Inc, for a tool storage cabinet having integrated power. The Snap-on Inc reference discloses a tool storage unit having a cabinet structure with a plurality of surfaces defining a first interior space and a storage compartment defining a second interior space, the compartment being configured to move between an open position extending from the first interior space and a closed position retracted within the first interior space. A stationary compartment sidewall fixed within the first interior space and adjacent storage compartment limits access to the second interior space from the first interior space when the storage compartment is in closed position. A plurality of power outlets positioned within the storage compartment such that each is accessible from the second interior space, and a locking feature for securing the storage compartment in the closed position are also featured. Finally, a recessed area integral to the top surface, a cover hinged to the top surface and covering the recessed area, and a power outlet positioned with the recessed area is a further feature of the disclosed storage unit. A power outlet positioned on the top surface of the cabinet structure outside of the recessed area may also be provided.

Applicant believes that a related reference corresponds to Chinese Utility model application CN 2761376 Y filed by JINGJING METAL CO LTD for tool cabinet having power source socket and plug used as extended line. The JINGJING METAL CO LTD reference discloses tool cabinet with a power source socket and a plug used as an extended wire, which is provided with a wire winder curled with a power source wire, one end of which is provided with a socket which is installed on the side edge of the tool cabinet with a power source socket and a plug used as an extended wire and the other end of which is provided with a plug which is penetrated out of the tool cabinet with a power source socket and a plug used as an extended wire. The utility model can use that the plug on the power source wire is inserted on a building as an extended wire. An electric tool which is required to be inserted with electricity can be directly inserted on the socket on the tool cabinet with a power source socket and a plug used as an extended wire.

Other documents describing the closest subject matter provide for a number of more or less complicated features that fail to solve the problem in an efficient and convenient way. None of these patents suggest the novel features of the present invention.

SUMMARY OF THE INVENTION

It is an object of the present invention to provide to a multi-purpose utility box that provides multiple electrical outlets for powering various tools of various applications such as construction work, hair-styling work.

It is yet another object of the present invention to provide a multi-purpose utility box comprising: a storage unit for storing one or more tools, a power plug for connecting to electrical power mains to supply electrical power to tools, a power adaptor to convert supply electrical power to various power supply ranges to meet power requirements of each tools and a power outlet unit to connect various tools and to supply various power supply ranges to tools.

It is yet another object of the present invention to provide a multi-purpose utility box that provides convenient access to power outlet unit for easy working of various tools.

It is yet another object of the present invention to provide a multi-purpose utility box that comprises electrical power card to connect tools to power outlet unit.

It is yet another object of the present invention to provide a multi-purpose utility box that is used to charge various electrical devices, such as mobile phone, laptops and the like.

It is yet another object of the present invention to provide a multi-purpose utility box that comprises at least one wireless speakers to allow user or owner of the box to listen music whenever required, by wirelessly connecting to at least one electronic device, such as mobile phone, laptop, and so on.

It is yet another object of the present invention to provide a multi-purpose utility box that comprises wherein storage box comprises at least one lid with at least one logo and/or text on it.

It is yet another object of the present invention to provide a multi-purpose utility box that eliminates the hassle of having worker or user to bend over all the time to manage power cords, by creating a more convenient work environment that improves on-the-job productivity.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combi

FIG. 3 represents an isometric view of the multi-purpose utility box 10 in open state, showing the storage unit 6 with various tools 8 connected to power outlet unit 3. The power outlet unit 3 is also used to charge various electronic devices 5 such as, mobile phone, laptop, and so on.

DETAILED DESCRIPTION OF THE EMBODIMENTS OF THE INVENTION

Figure 1:
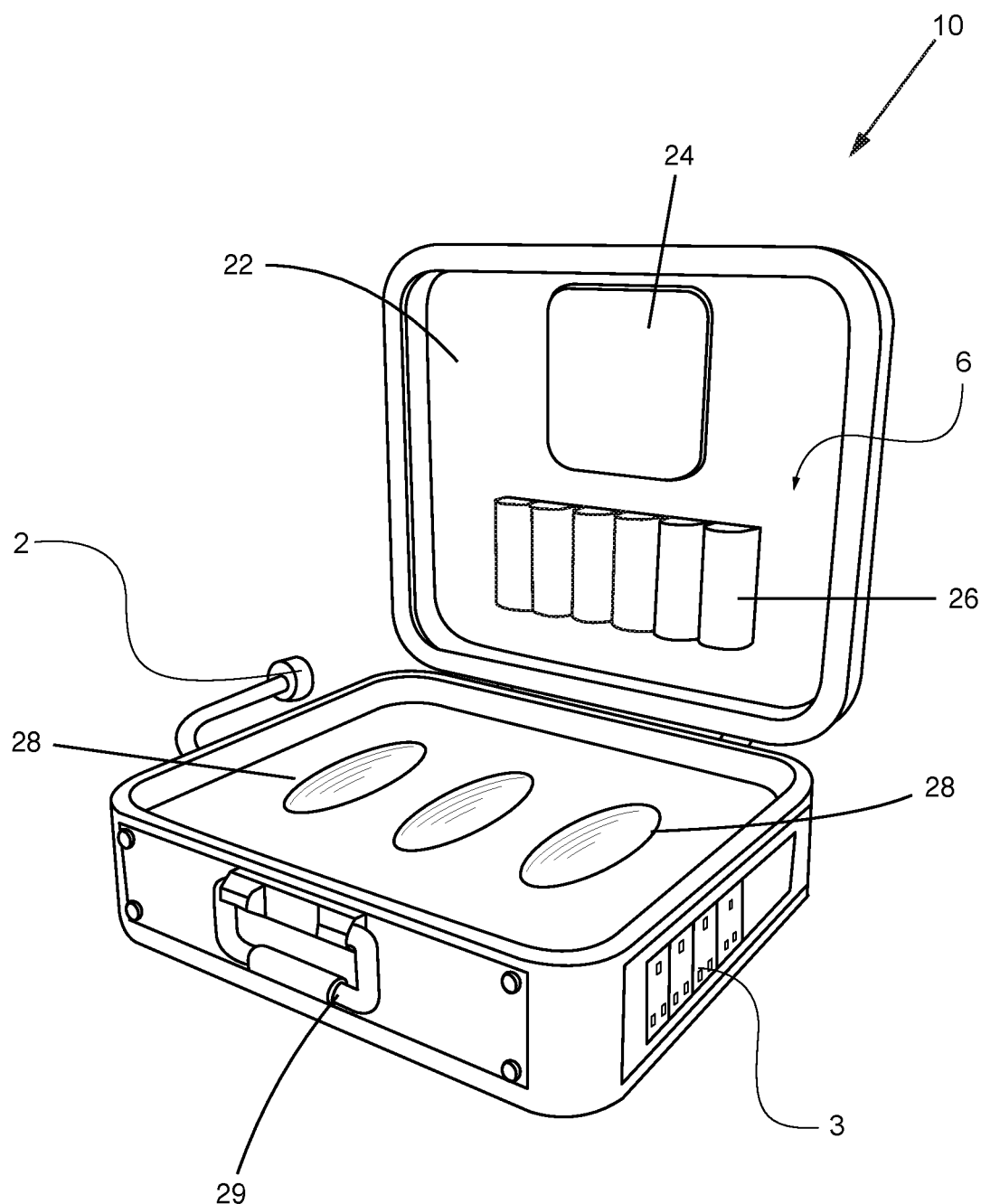
- FIG. 1 represents an isometric view of the multi-purpose utility box 10 in open state, showing the storage unit 6, power plug 2 and power outlet unit 3.

Referring now to the drawings, FIG. 1, where the present invention is generally referred to with numeral 10, it can be observed that a multi-purpose utility box 10, in accordance with one embodiment, is provided that includes storage unit 6, power input plug/power plug 2 and power outlet unit 3. The multi-purpose utility box 10 can store various tools of workers, such as hair style workers, construction workers, and so on, in a well-organized manner. The multi-purpose utility box 10 also provides one stop solution for connecting various tools in the power outlet unit 3, without looking for a separate power sockets to connect each tools. Further, the tools can be easily stored in storage unit 6 with power cords. Tools can be conveniently connected to various power outlets of power outlet unit 3 and can be easily used whenever required. Storage unit 6 may further include a top compartment 22. Top compartment 22 may further include an interior surface having a support pad 24 and hollowed tool holders 26. In one embodiment, support pad 24 may be rectangular in shape. Furthermore, hollowed tool holders 26 may be located underneath the support pad 24 and configured to hold a plurality of hair style tools. Additionally, storage unit 6 may further include pockets 28 configured to hold hair styling tools therein. In one embodiment, pockets 28 may oval in shape configured to cooperate with the shape of hair styling tools such as electric razors and the like. Storage unit 6 may further include a handle 29 mounted to a front end of storage unit 6. In one embodiment, handle 29 may be mounted to storage unit 6 using fasteners.

Figure 2:
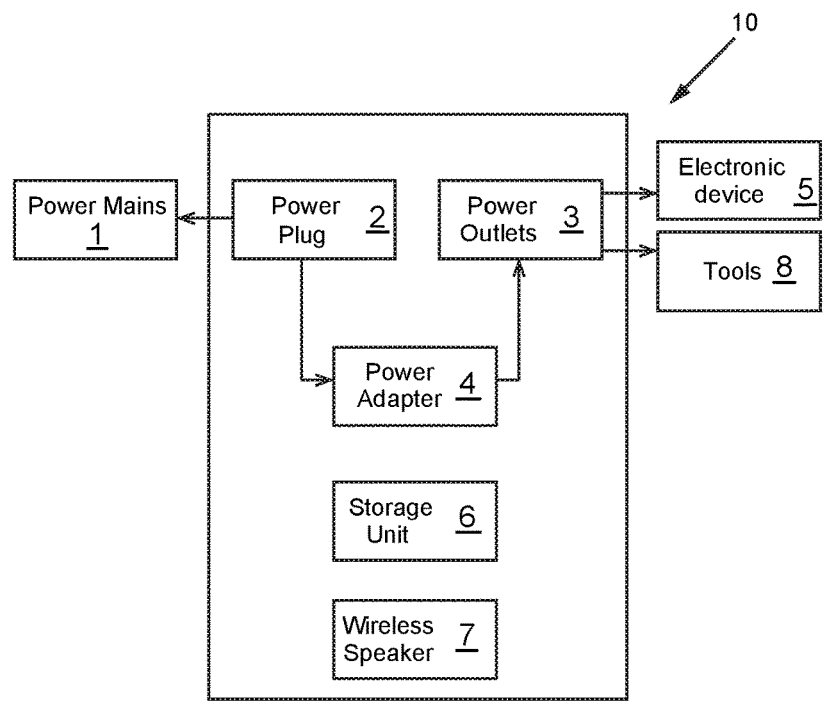
FIG. 2 demonstrates of block diagram of multi-purpose utility box 10, showing various elements, storage unit 6 for storing various tools, power plug 2, power adapter 4 and power outlet unit 3 to connect and power various tools 8 and electronic devices 5.

FIG. 2 illustrates the block diagram of features of the multi-purpose utility box 10. A power input plug 2 can be connected to available power mains 12. Power adapter 4 interfaces to input power from power mains 1 through power plug 2 and provides different range of power at power outlet unit 3. Various type of electronics devices 5 can be connected at power outlets of power outlet unit 3 for charging without limiting to any one particular type. Multi-utility box 10 comprises of storage unit 6 wherein various types of tools 8 can be stored. The tools can be wireless tools and/or corded tools. Multi-purpose utility box 10 also comprises of a wireless speaker 7 which can be interfaced to any of electronics devices 5, such as mobile, laptops, music players for providing entertainment.

Figure 3:
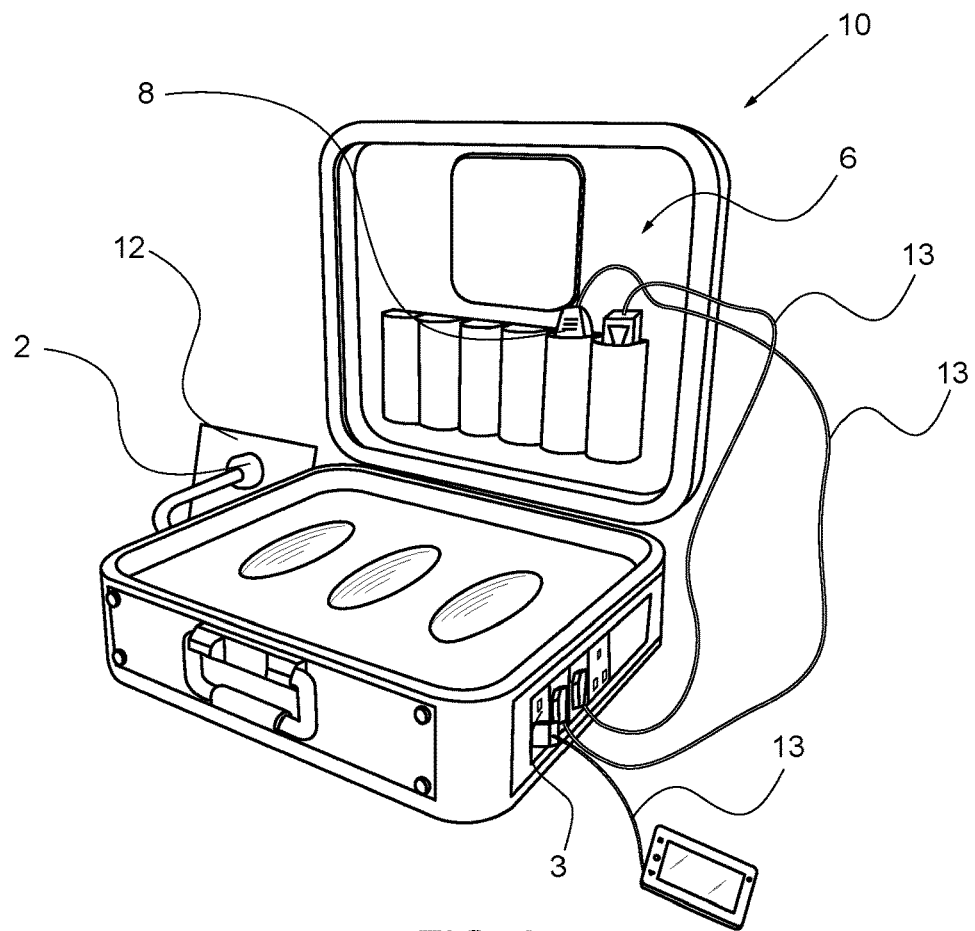

As depicted in FIG. 3, power input plug 2 is connected to power mains 12. An electronic device can be connected to one of the power outlets of power outlet unit 3, through multi interface power cord 13. Power outlets of power outlet unit 3 and its interfacing power cords 13 are not limited to any one particular type. Various type of tools 8 are housed in storage unit 6 which can be connected to one of the power outlet unit 3 through power cords 13 thereby eliminating the hassle of having to bend over all the time to manage power cords. The user or worker can conveniently work by connecting all of their tools easily to power outlets of the box.

Figure 4:
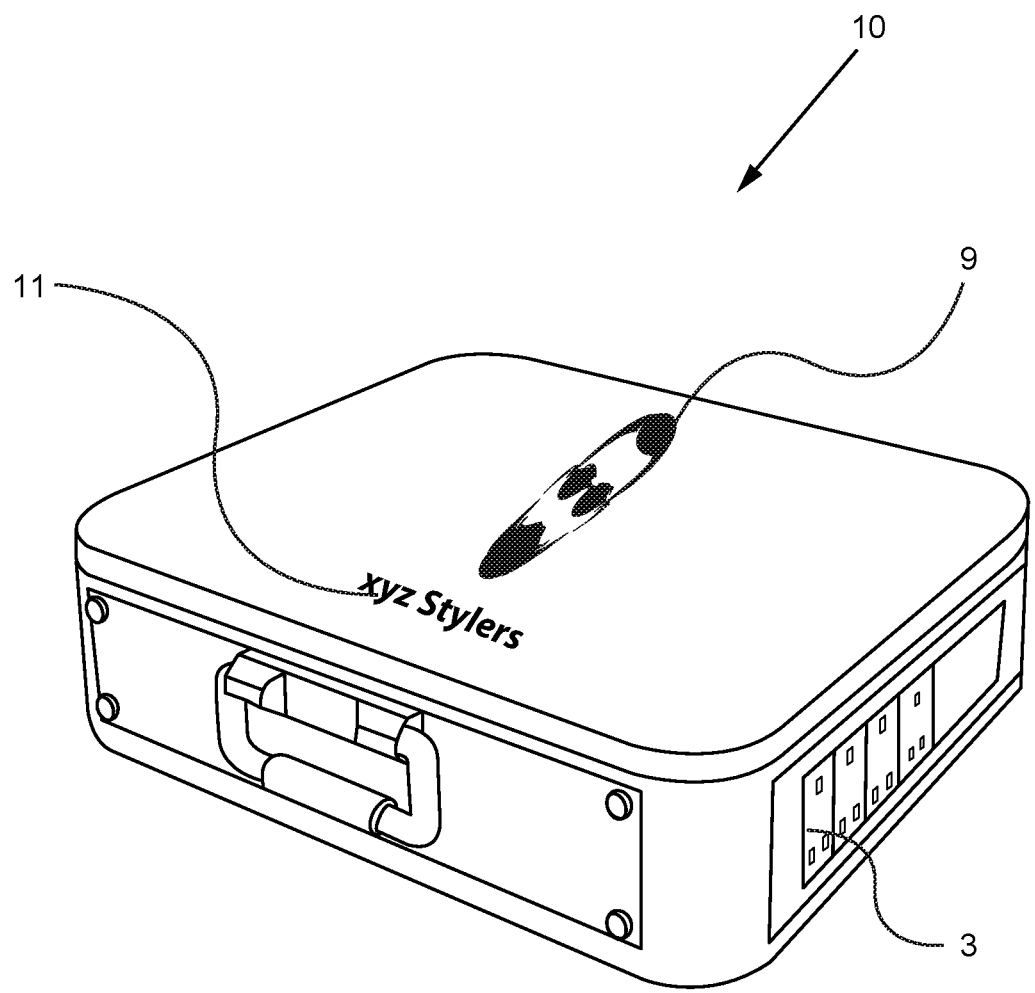
FIG. 4 is an isometric view of the multi-purpose utility box 10 in closed state, showing lid printed with logo 9 or text 11 related to box user or owner.

FIG. 4 illustrates closed view of the multi-purpose utility box 10. As depicted, various names 11 and/or logos 9 can be imprinted on lid of multi-purpose utility box 10.

The present invention is designed to satisfy all power requirements of electronic devices and tools. The electronic devices are not limited to mobile phones, laptops, and so on. The box may further include a power bank or battery to fulfill power requirements of low power tools and electronics devices, during travel and hence provides portable power source for the tools and electronic devices. In one aspect of the present invention, tools can be wireless and can be charged when stored in storage unit of box. The box may further comprises one or more fuse to protect and safeguard tools or electronic devices connected to the power outlets for power supply.

The present invention, provides multiple electrical outlets for powering various hair-styling tools, such as clippers and also usable to power other electronic devices, including cell phones, tablets, laptops, and so on. Further, present invention eliminates the hassle of having worker or user to bend over all the time to manage power cords, by creating a more convenient work environment that improves on-the-job productivity.

The present invention can be used in a wide variety of similar situations, not limited to hair style works and construction works. The box can be plugged into any accessible outlet/mains. The clippers and other styling appliances could then be plugged into the box to provide one station for a multitude of hairstyling tools.

The multi-purpose utility box can measure 6 inches high, 32 inches long and 16 inches wide and could be produced in various colors and styles. The box can be used with other applications, such as construction work with power tools; while vacationing; for mobile devices, such as laptops, speakers, tablets, and so on.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multi-purpose utility box, comprising:
   a. a base compartment having sidewalls and said base compartment further having pockets to receive hair styling tools, and a hingedly mounted top compartment having an interior surface, a support pad mounted to said interior surface, a plurality of hollowed tool holders having a partially cylindrical shape, said support pad being entirely above said hollowed tool holders, said hollowed tool holders are the same size and parallel to each other;
   b. a power plug located on a sidewall of said base compartment adapted to plug into a power outlet on a wall;
   c. a power adaptor configured to provide a range of power supply ranges to meet power requirements of said utility box; and d. a power outlet unit located on one of said sidewalls opposite said power plug.

2. The multi-purpose utility box of claim 1 wherein said power outlet unit is configured to charge various electrical devices.

3. The multi-purpose utility box of claim 1 further comprises at least one wireless speakers includes a wireless speaker therein.

4. The multi-purpose utility box of claim 1 further including hair styling tools being clippers and electric razors stored in said hollowed tool holders.

5. The multi-purpose utility box of claim 1 wherein said power outlet unit includes a charging adapter to charge a mobile device.

6. The multi-purpose utility box of claim 1 wherein said pockets are oval-shaped and the same dimensions and are spaced apart an equal distance, each of said pockets is larger than each of said hollowed tool holder.

* * * * *